July 25, 1950      T. T. HODGE      2,516,385
TRANSMISSION

Filed March 26, 1947      2 Sheets-Sheet 1

INVENTOR
T. T. Hodge
BY
ATTORNEYS

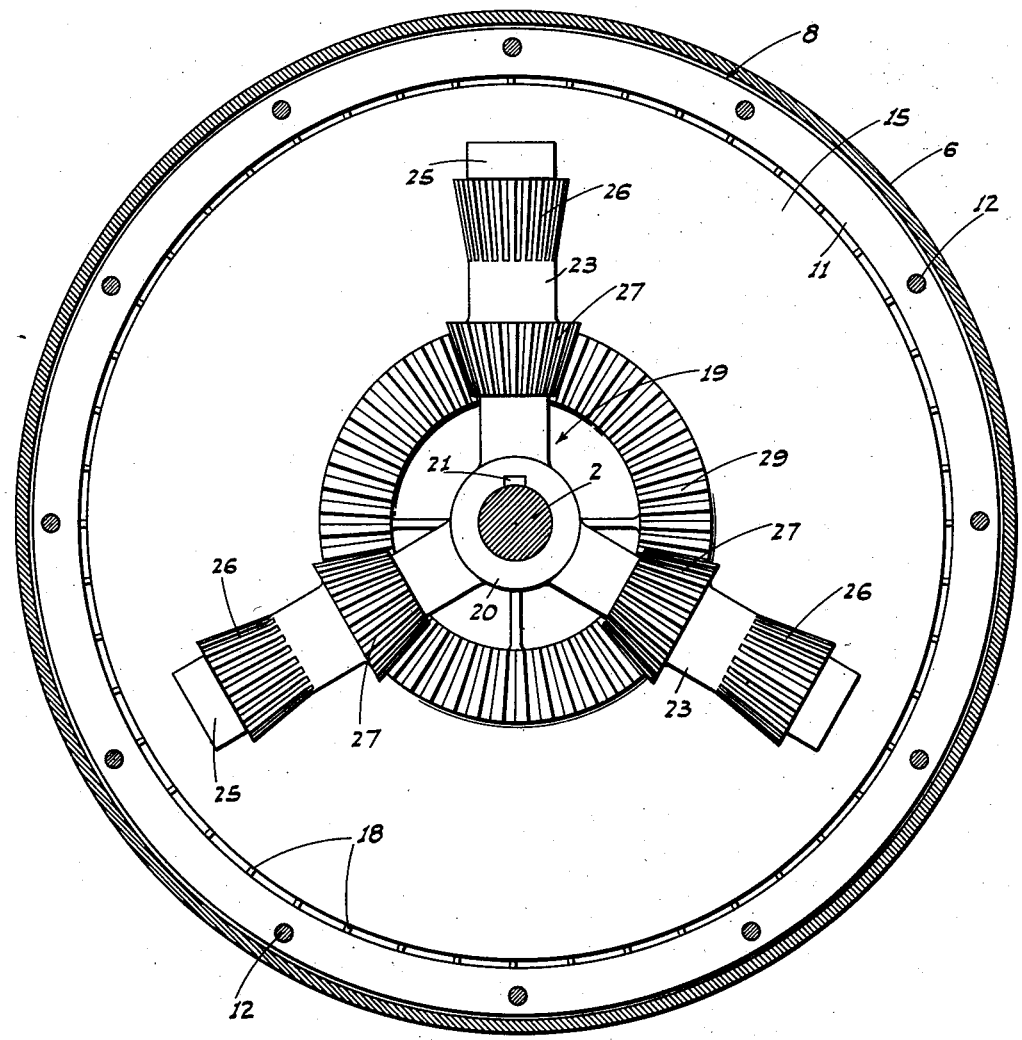

Patented July 25, 1950

2,516,385

UNITED STATES PATENT OFFICE 2,516,385

TRANSMISSION

Theodore T. Hodge, Manteca, Calif., assignor, by direct and mesne assignments, to Lester O. Kern, Modesto, Calif., as trustee for Joint Venture Hodge Application March 26, 1947, Serial No. 737,215

3 Claims. (Cl. 74—677)

This invention relates to, and it is an object to provide, an improved transmission of fluid-coupling type; the transmission, while being adaptable to many uses, being especially designed for use in motor vehicles such as automobiles, trucks, etc.

Another object of the invention is to provide a transmission, of the type described, which includes a pair of fluid coupling units and a spider gear unit in unique assembly with a drive and driven shaft; such assembly being operative to impart a variable ratio drive to the driven shaft from the drive shaft, dependent on the load imposed on said driven shaft.

A further object of the invention is to provide a fluid coupling transmission which is simple but rugged in construction, and designed for long use with a minimum of maintenance and repair.

These objects are accomplished by means of such structure and relative arrangement of parts as will fully appear by a perusal of the following specification and claims.

In the drawings:

Fig. 2 is a cross section of the transmission on line 2—2 of Fig. 1.

Figure 1:
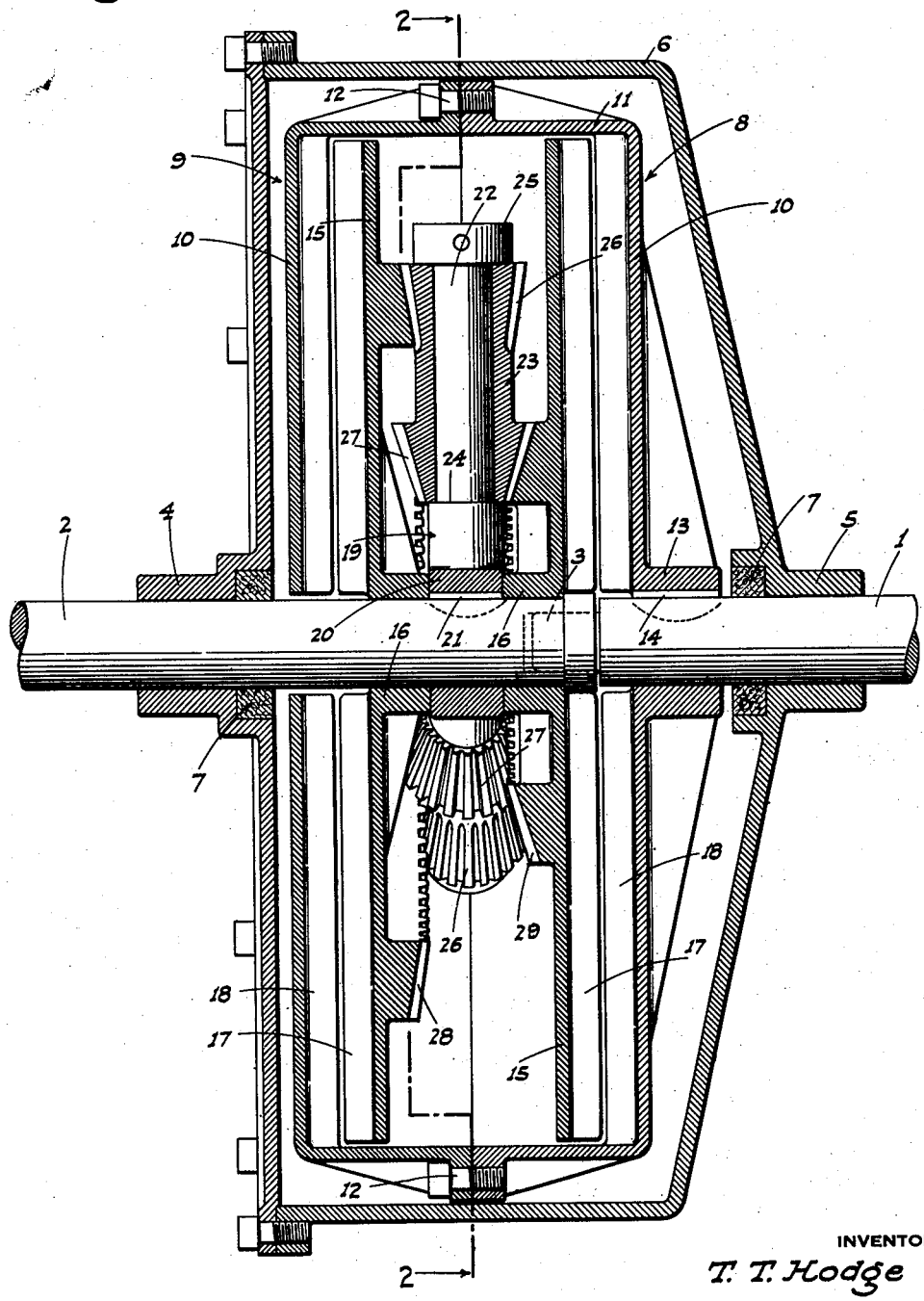
Fig. 1 is a sectional elevation of the transmission.

Referring now more particularly to the characters of reference on the drawings, the fluid coupling type transmission is shown as mounted in connection with a drive shaft 1 and an axially alined driven shaft 2, said shafts being held in alinement by a boss 3 on shaft 1 projecting into a matching bore in the other shaft.

The shafts 1 and 2 project through bearings 4 and 5 in opposite ends, respectively, of a fixed housing 6; there being oil seals 7 in said bearings whereby the housing 6 may carry a quantity of transmission oil or fluid.

The drive shaft 1 is of course adapted to be connected to the engine, whereas the driven shaft 2 leads to the differential of the vehicle in which the transmission is used.

Within the fixed, fluid retaining housing 6 the transmission includes a pair of fluid coupling units, indicated generally at 8 and 9; said units being constructed and mounted as follows:

The fluid coupling units 8 and 9 each include a circular, drive impeller 10, which impellers are spaced axially apart, and are formed as a unitary part of a rotary cage 11 which surrounds and spans between adjacent end portions of the shafts 1 and 2 within said housing 6. This rotary cage 11 is drum-like and sectional, comprising two half sections secured together by cap screws 12.

At the end adjacent the drive shaft 1 the rotary cage 11 includes a hub 13 fixed on said drive shaft by a key 14. The opposite end of the rotary cage 11 runs free relative to the driven shaft 2.

Within the rotary cage 11 the transmission includes a pair of axially spaced rotary discs 15 having hubs 16 journaled in relatively rotatable relation on the driven shaft 2.

Adjacent faces of the circular drive impellers 10 of the rotary cage 11, and the rotary discs 15, are vaned with fluid coupling-type vanes, as at 17 and 18, respectively. The vaned rotary discs 15 form circular driven impellers of the coupling units 8 and 9, respectively.

Between the rotary discs 15 the structure includes a spider gear unit, indicated generally at 19, constructed and mounted as follows:

A hub 20 is fixed on the driven shaft 2 by a key 21, and a plurality of spider shafts 22 radiate from the hub 20 in equally spaced relation circumferentially of said hub; the spider shafts 22 terminating at their outer ends short of the periphery of the rotary cage 11.

Each of the spider shafts 22 is fitted with a rotary sleeve 23 maintained in place on the corresponding spider shaft between a shoulder 24 and an end head 25. Each of the rotary sleeves 23 is formed, in axially spaced relation thereon, with an outer pinion 26 and an inner pinion 27; the outer pinions 26 running in mesh with a ring gear 28 formed on the adjacent side of one of the rotary discs 15, while the inner pinions 27 run in mesh with another ring gear 29 formed on the adjacent face of the other rotary disc 15.

The above described transmission, of fluid coupling type, functions as follows:

Upon rotation of the drive shaft 1 the rotary cage 11, being keyed thereto, as at 14, is constantly and positively driven, turning the annular drive impellers 10 therewith. This drive is imparted, through the fluid in the fixed housing 6, from the vanes 18 to the vanes 17, causing rotation in the same direction, of the rotary discs 15. These rotary discs, traveling in the same direction, impart their rotation to the driven shaft 2 through the medium of the described spider gear unit 19, whose hub 20 is keyed to said driven shaft, as at 21. In this manner both of the fluid coupling units 8 and 9 function effectively to transmit power from the drive shaft 1 to the driven shaft 2 through the spider gear unit 19.

The effective ratio of this transmission is proportioned to the load imposed upon the driven shaft 2, as follows:

Under relatively heavy load conditions, the fluid coupling unit 8 acts through the ring gear 29 and inner pinions 27 to impart a low ratio drive to shaft 2, while under relatively light load conditions the fluid coupling unit 9 acts through the ring gear 28 and outer pinions 26 to impart a higher ratio drive to said shaft as is then desirable. This is possible because the rotary discs 15 are capable of differential speed in the same direction so that one of the fluid couplings can relatively slip while the other is carrying the major load. Under normal working conditions, the load is equalized and both couplings 8 and 9 function as the drive imparting medium, the dual arrangement substantially reducing friction loss and providing an efficient transmission mechanism.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A transmission comprising a housing adapted to retain a quantity of coupling fluid, a drive shaft and an alined driven shaft extending into the housing from opposite ends thereof, a pair of axially spaced fluid coupling units in the housing, each such unit comprising an impeller and a rotor disposed in adjacent facing working relation to each other, the impellers being fixed in connection with the drive shaft, the rotors being rotatable relative to both shafts and journaled on one thereof, and a spider gear unit connecting said rotors in driving relation to the driven shaft; said rotors including rotatable discs, ring gears on adjacent faces of said discs, and a spider gear unit fixed on the driven shaft between said discs and including rotatable pinions corresponding to and meshing with the ring gears, the ring gear on one disc being of greater diameter than the ring gear on the other disc.

2. A transmission comprising a housing adapted to retain a quantity of coupling fluid, a drive shaft and an alined driven shaft extending into the housing from opposite ends thereof, a pair of axially spaced fluid coupling units in the housing, each such unit comprising an impeller and a rotor disposed in adjacent facing working relation to each other, the impellers being fixed in connection with the drive shaft, the rotors being rotatable relative to both shafts and journaled on one thereof, and a spider gear unit connecting said rotors in driving relation to the driven shaft; said rotors including rotatable discs, ring gears on adjacent faces of said discs, and a spider gear unit fixed on the driven shaft between said discs and including rotatable pinions corresponding to and meshing with the ring gears, the ring gear on one disc being of greater diameter than the ring gear on the other disc, and the corresponding pinions being correspondingly axially spaced.

3. A transmission comprising a fixed housing, a driving shaft journaled in one side of the housing and a driven shaft journaled in the opposite side of the housing and being co-axial with the driving shaft, both shafts having their inner ends projecting into the housing, a rotary cage disposed within the fixed housing and being connected in driving relation with the driving shaft and surrounding the driven shaft, fluid impellers fixed to each inner face of the cage, a pair of spaced apart discs rotatably mounted on the driven shaft within the cage, fluid rotors on the outer face of each disc disposed in facing relation to the impellers on the cage, a ring gear on the inner face of one disc at a point adjacent the driven shaft, a ring gear on the inner face of the other disc at a point radially out with respect to the position of the first named ring gear, a hub keyed to the driven shaft between the discs, a radially disposed shaft fixed on the hub, a rotary sleeve on the last named shaft, a pair of spaced apart pinions on the sleeve, each of said pinions meshing with one of said ring gears.

THEODORE T. HODGE.

REFERENCES CITED

The following references are of record in the file of this patent:

UNITED STATES PATENTS

| Number | Name | Date |
|---|---|---|
| 1,242,974 | Pinckney | Oct. 16, 1917 |
| 1,711,095 | Klimek | Apr. 30, 1929 |
| 2,162,803 | England | June 20, 1939 |
| 2,260,581 | Pollard | Oct. 28, 1941 |
| 2,336,055 | Bacon | Dec. 7, 1943 |
| 2,388,062 | Keller | Oct. 30, 1945 |

FOREIGN PATENTS

| Number | Country | Date |
|---|---|---|
| 407,146 | Great Britain | Mar. 15, 1934 |